(12) United States Patent
Ota

(10) Patent No.: US 7,901,598 B2
(45) Date of Patent: Mar. 8, 2011

(54) SOLID ELECTROLYTE AND METHOD OF PRODUCING THE SAME

(75) Inventor: Nobuhiro Ota, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 971 days.

(21) Appl. No.: 11/798,084

(22) Filed: May 10, 2007

(65) Prior Publication Data

US 2007/0264579 A1 Nov. 15, 2007

(30) Foreign Application Priority Data

May 15, 2006 (JP) ................................. 2006-135858

(51) Int. Cl.
H01B 1/10 (2006.01)
H01M 6/18 (2006.01)
B05D 5/12 (2006.01)

(52) U.S. Cl. ................. 252/521.5; 429/322; 204/192.15; 427/96.1

(58) Field of Classification Search ............... 252/518.1, 252/521.5; 429/322; 204/192.15; 427/96
See application file for complete search history.

(56) References Cited

U.S. PATENT DOCUMENTS

| 6,924,064 B2 * | 8/2005 | Kondo et al. | 429/231.95 |
| 7,416,815 B2 * | 8/2008 | Ota et al. | 429/231.95 |

FOREIGN PATENT DOCUMENTS

| EP | 0 469 574 A1 | 2/1992 |
| EP | 1 365 470 A1 | 11/2003 |
| EP | 1 732 152 A1 | 12/2006 |
| JP | 2002-109955 | 4/2002 |
| JP | 2002-184455 | 6/2002 |
| JP | 2002-329524 A | 11/2002 |
| JP | 2004-220906 A | 8/2004 |
| JP | 2005-228570 | 8/2005 |

OTHER PUBLICATIONS

Murayama, M., et al., "Material design of new lithium ionic conductor, thio, Lisicon, in the $Li_2S$-$P_2S_6$ system", Solid State Ionics, vol. 170, 2004, pp. 173-180, Elsevier B.V.

Mizuno, F., et al., "New Lithium-Ion Conducting Crystal Obtained by Crystallization of the $Li_2S$-$P_2S_6$ Glasses", Electrochemical and Solid-State Letters, vol. 8, 2005, pp. A603-A606, The Electrochemical Society, Inc.

(Continued)

Primary Examiner — Mark Kopec
(74) Attorney, Agent, or Firm — McDermott Will & Emery LLP

(57) ABSTRACT

A solid electrolyte and a method of manufacturing the same are provided. The solid electrolyte contains x atomic % of lithium, y atomic % of phosphorus, z atomic % of sulfur, and w atomic % of oxygen, in which
the x, the y, the z, and the w satisfy the following expressions (1)-(5):

$20 \leq x \leq 45$ (1)

$10 \leq y \leq 20$ (2)

$35 \leq z \leq 60$ (3)

$1 \leq w \leq 10$ (4)

$x+y+z+w=100$ (5), and apexes of X-ray diffraction peaks in an X-ray diffraction pattern obtained by an X-ray diffraction method using a $K\alpha$-ray of Cu exist at diffraction angles $2\theta$ of $16.7°\pm0.25°$, $20.4°\pm0.25°$, $23.8°\pm0.25°$, $25.9°$, $0.25°$, $29.4°\pm0.25°$, $30.4°\pm0.25°$, $31.7°\pm0.25°$, $33.5°\pm0.25°$, $41.5°\pm0.25°$, $43.7°\pm0.25°$, and $51.2°\pm0.25°$, respectively, in the X-ray diffraction pattern, and a half-width of each of the X-ray diffraction peaks is not larger than $0.5°$.

6 Claims, 3 Drawing Sheets

OTHER PUBLICATIONS

Kazunori Takada, et al., "Lithium ion conductive oxysulfide, $Li_3PO_4$-$Li_3PS_4$,", Solid State Ionics, 2005, 2355-2359, Elsevier B.V.

European Search Report issued in European Patent Application No. EP 07 25 1922.6, dated Apr. 7, 2010.

Japanese Office Action, with English Translation, issued in Japanese Office Action issued in Japanese Patent Application No. JP 2006-135858 dated on May 16, 2008.

* cited by examiner

SOLID ELECTROLYTE AND METHOD OF PRODUCING THE SAME

BACKGROUND OF THE INVENTION

1. Field of the Invention

The present invention relates to a solid electrolyte and a method of producing the same, and particularly relates to a solid electrolyte having high ion conductivity and low reactivity with an electrode material and a method of producing the same.

2. Description of the Background Art

Conventionally, a lithium secondary battery using an organic electrolytic solution has been put into practical use. Such a lithium secondary battery using an organic electrolytic solution is characterized in that it has higher energy output per unit volume or per unit mass when compared with other batteries. Accordingly, the lithium secondary battery using an organic electrolytic solution has been developed and put into practical use to serve as a power source designed for mobile communication equipment, a notebook-sized personal computer, and an electric vehicle.

As to the conventional lithium secondary battery using an organic electrolytic solution, the organic electrolytic solution is basically a flammable substance. Accordingly, there arises a problem of temperature rise in the organic electrolytic solution, or a problem of incurring a risk of explosion of the lithium secondary battery when an impact is exerted on the organic electrolytic solution.

As to the lithium secondary battery using an organic electrolytic solution, there also arises a problem of incurring the risk of its explosion when a lithium-containing metal or the like is used for its negative electrode to improve energy density. This is because the lithium-containing metal may be precipitated on a surface of the negative electrode and grown in a dendrite form while the battery is repeatedly charged and discharged, resulting in that the lithium-containing metal grown in a dendrite form may cause a short circuit between the positive electrode and the negative electrode.

Accordingly, there has recently been considered the use of a solid electrolyte instead of the organic electrolytic solution used in the conventional lithium secondary battery, and there has been conducted a study of a solid electrolyte having high lithium ion conductivity and chemical stability.

When such a solid electrolyte is used for the lithium secondary battery, it is possible to overcome the above-described problems of the lithium secondary battery using an organic electrolytic solution, and additionally, obtain a stable operation even in a severe environment such as not lower than 200° C. or not higher than −20° C., which stable operation was difficult to obtain in the conventional lithium secondary battery using an organic electrolytic solution.

For example, Patent Document 1 (Japanese Patent Laying-Open No. 2002-184455) discloses a method of forming a solid electrolyte thin film having lithium and sulfur as essential constituents and containing at least one element selected from the group consisting of phosphorus, silicon, boron, germanium, and gallium. According to the method disclosed in Patent Document 1, there is performed a step of heating the solid electrolyte thin film to not lower than 40° C. and not higher than 200° C. to improve ion conductivity.

Furthermore, Patent Document 2 (Japanese Patent Laying-Open No. 2002-109955) discloses sulfide-based crystallized glass (solid electrolyte) obtained by calcining sulfide-based glass having $Li_2S$ and $P_2S_5$ as major constituents. This sulfide-based crystallized glass (solid electrolyte) is composed of a glass phase having $Li_2S$ and $P_2S_5$ as major constituents and a crystal phase containing a sulfide.

Patent Document 3 (Japanese Patent Laying-Open No. 2005-228570) discloses sulfide-based crystallized glass (solid electrolyte) having a particular crystal structure obtained by calcining at 150-360° C. sulfide-based glass having a composition of 68-74 mol % of $Li_2S$ and 26-32 mol % of $P_2S_5$.

In any of the above-described Patent Documents 2 and 3, calcination at a temperature not lower than a glass transition temperature is required for crystallization of the sulfide-based crystallized glass (solid electrolyte).

Furthermore, each of Non-Patent Document 1 (Solid State Ionics 170 (2004) pp. 173-180) and Non-Patent Document 2 (Electrochemical and Solid-State Letters 8 (11) A603-A606 (2005)) discloses a solid electrolyte made of $Li_2S$ and $P_2S_5$. Non-Patent Document 1 discloses in FIG. 2 on page 176, and Non-Patent Document 2 discloses in FIG. 3, X-ray diffraction patterns of the solid electrolytes, respectively, obtained by an X-ray diffraction method.

SUMMARY OF THE INVENTION

Properties required for the solid electrolyte used for a lithium secondary battery are high ion conductivity, low electron conductivity, and a favorable withstand voltage property.

Furthermore, when the solid electrolyte is used for a lithium secondary battery, it is important to suppress an oxidation-reduction reaction between a negative electrode material and positive electrode material such as lithium, and the solid electrolyte. It is also important to prevent the solid electrolyte from causing an oxidation-reduction reaction with the negative electrode material and positive electrode material and being decomposed and degraded.

In view of the above-described circumstances, an object of the present invention is to provide a solid electrolyte and a method of producing the same, the solid electrolyte having high ion conductivity and low reactivity with an electrode material.

The present invention is a solid electrolyte containing x atomic % of lithium, y atomic % of phosphorus, z atomic % of sulfur, and w atomic % of oxygen, in which the x, the y, the z, and the w satisfy the following expressions (1)-(5):

$$20 \leq x \leq 45 \quad (1)$$

$$10 \leq y \leq 20 \quad (2)$$

$$35 \leq z \leq 60 \quad (3)$$

$$1 \leq w \leq 10 \quad (4)$$

$$x+y+z+w=100 \quad (5), \text{ and}$$

apexes of X-ray diffraction peaks in an X-ray diffraction pattern obtained by an X-ray diffraction method using a Kα-ray of Cu exist at diffraction angles 2θ of 16.7°±0.25°, 20.4°±0.25°, 23.8°±0.25°, 25.9°±0.25°, 29.4°±0.25°, 30.4°±0.25°, 31.7°±0.25°, 33.5°±0.25°, 41.5°±0.25°, 43.7°±0.25°, and 51.2°±0.25°, respectively, in the X-ray diffraction pattern, and a half-width of each of the X-ray diffraction peaks is not larger than 0.5°.

In the solid electrolyte according to the present invention, ion conductivity at 25° C. is preferably at least $1 \times 10^{-3}$ S/cm.

Furthermore, in the solid electrolyte according to the present invention, activation energy is preferably not larger than 35 kJ/mol. In the present invention, the activation energy refers to energy required for conducting a lithium ion through the solid electrolyte.

Furthermore, the present invention is a method of producing a solid electrolyte, including: a first step of forming, on a base material, a solid electrolyte precursor containing x atomic % of lithium, y atomic % of phosphorus, z atomic % of sulfur, and w atomic % of oxygen by a vapor deposition method, the x, the y, the z, and the w satisfying the following expressions (1)-(5):

$$20 \leq x \leq 45 \quad (1)$$

$$10 \leq y \leq 20 \quad (2)$$

$$35 \leq z \leq 60 \quad (3)$$

$$1 \leq w \leq 10 \quad (4)$$

$$x+y+z+w=100 \quad (5); \text{and}$$

a second step of forming the solid electrolyte precursor into the solid electrolyte by heating the solid electrolyte precursor, the solid electrolyte being such that apexes of X-ray diffraction peaks in an X-ray diffraction pattern obtained by an X-ray diffraction method using a Kα-ray of Cu exist at diffraction angles 2θ of 16.7°±0.25°, 20.4°±0.25°, 23.8°±0.25°, 25.9°±0.25°, 29.4°±0.25°, 30.4°±0.25°, 31.7°±0.25°, 33.5°±0.25°, 41.5°±0.25°, 43.7°±0.25°, and 51.2°±0.25°, respectively, in the X-ray diffraction pattern, and that a half-width of each of the X-ray diffraction peaks is not larger than 0.5°.

In the method of producing the solid electrolyte according to the present invention, the second step is preferably a step of heating the solid electrolyte precursor to a temperature higher than 200° C. and lower than a glass transition temperature of the solid electrolyte precursor, when and/or after the solid electrolyte precursor is formed.

In the method of producing the solid electrolyte according to the present invention, the solid electrolyte precursor is preferably heated to a temperature higher than 200° C. and not higher than 250° C.

According to the present invention, it is possible to provide a solid electrolyte having high ion conductivity and low reactivity with an electrode material and a method of producing the same.

The above-described and other objects, characteristics, aspects, and advantages of the present invention will be clarified from the detailed description below, which is understood with reference to the drawings attached herewith.

DESCRIPTION OF THE PREFERRED EMBODIMENTS

Figure 1:
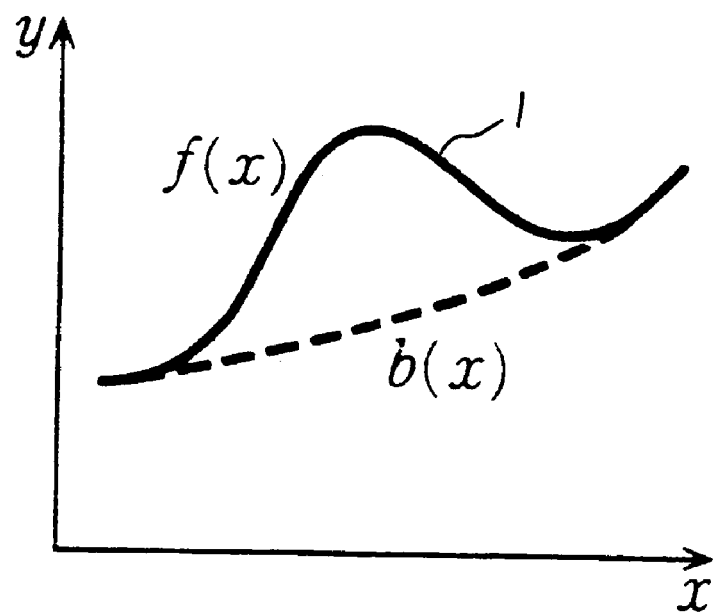
FIGS. 1 and 2 are drawings for illustrating a method of measuring a half-width in the present invention.

The present inventor has found from exhaustive examination that, when the solid electrolyte is neither a so-called amorphous phase nor a thermodynamically-stable phase, and instead is in a state intermediate therebetween, namely, a thermodynamically-metastable phase, it exhibits high ion conductivity and an excellent property of suppressing an oxidation-reduction reaction with an electrode material (resistance to an oxidation-reduction reaction), which leads to completion of the present invention.

The solid electrolyte according to the present invention is a solid electrolyte containing x atomic % of lithium, y atomic % of phosphorus, z atomic % of sulfur, and w atomic % of oxygen, characterized in that the x, the y, the z, and the w satisfy the following expressions (1)-(5):

$$20 \leq x \leq 45 \quad (1)$$

$$10 \leq y \leq 20 \quad (2)$$

$$35 \leq z \leq 60 \quad (3)$$

$$1 \leq w \leq 10 \quad (4)$$

$$x+y+z+w=100 \quad (5), \text{and that}$$

apexes of X-ray diffraction peaks in an X-ray diffraction pattern obtained by an X-ray diffraction method using a Kα-ray of Cu exist at diffraction angles 2θ of 16.7°±0.25°, 20.4°±0.25°, 23.8°±0.25°, 25.9°±0.25°, 29.4° +0.25°, 30.4°±0.25°, 31.7°±0.25°, 33.5°±0.25°, 41.5°±0.25°, 43.7°±0.25°, and 51.2°±0.25°, respectively, in the X-ray diffraction pattern, and a half-width of each of the X-ray diffraction peaks is not larger than 0.5°.

As to the solid electrolyte according to the present invention, apexes of X-ray diffraction peaks in its X-ray diffraction pattern obtained by an X-ray diffraction method (using a Kα-ray of Cu as an X-ray) exist at diffraction angles 2θ of the above-described ranges, and a half-width of each of the X-ray diffraction peaks is not larger than 0.5°. Accordingly, the solid electrolyte according to the present invention is different from a normal amorphous phase, which has a half-width of an X-ray diffraction peak of larger than 10°, and the X-ray diffraction peaks of the solid electrolyte according to the present invention appear at diffraction angles 2θ with ranges different from those of a thermodynamically-stable phase, so that it can be considered as a thermodynamically-metastable phase. Furthermore, crystallinity becomes more favorable with the decrease in half-width of the X-ray diffraction peak, and hence the half-width of the X-ray diffraction peak is preferably as small as possible. However, the half-width of the X-ray diffraction peak normally has a lower limit of approximately 0.01°.

In the X-ray diffraction method, when an incident X-ray is made incident at a tilted angle of θ relative to a measurement sample, a diffracted X-ray is usually detected at a tilted angle of 2θ relative to the incident X-ray, and hence a diffraction angle in the X-ray diffraction pattern is generally shown in 2θ. Accordingly, note that the diffraction angle in the X-ray diffraction pattern in the present invention is also expressed in 2θ.

Figure 2:
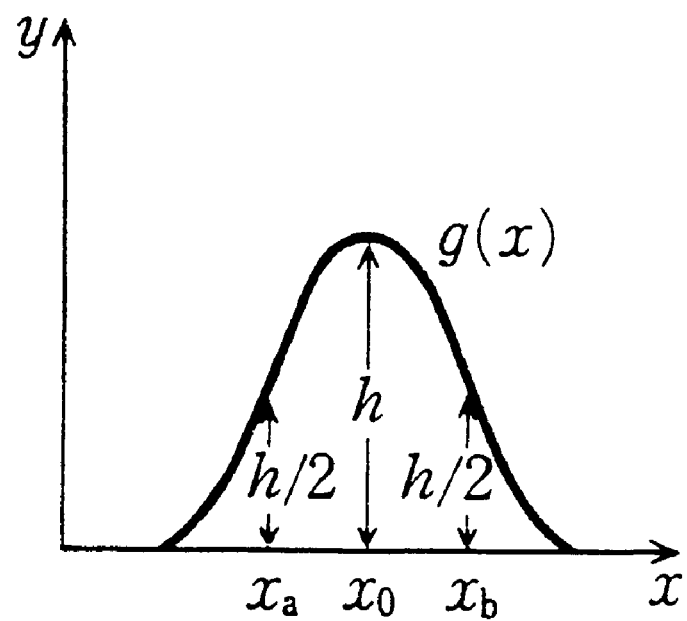

Assume that an X-ray diffraction peak 1 in the X-ray diffraction pattern is represented by a curve y=f(x) as shown in FIG. 1, for example, and that there is provided a curve g(x)=f(x)−b(x) on the periphery of a point where f(x) assumes a local maximal value (an apex of X-ray diffraction peak 1). As shown in FIG. 2, the half-width in the present invention can be determined by measuring a difference between two points $x_a$ and $x_b$, at which curve g(x) assumes a half value h/2 of a local maximal value h, on the x axis. In the X-ray diffraction pattern, the x axis in FIGS. 1 and 2 represents a diffraction angle 2θ(°), while the y axis represents intensity of the X-ray diffraction peak. In FIG. 1, curve y=b(x) is a virtual curve on the assumption that X-ray diffraction peak 1 does not exist.

The solid electrolyte according to the present invention, which is a thermodynamically-metastable phase, is allowed to have sulfur and oxygen mixed therein, and as a result, becomes capable of having high ion conductivity and suppressing an oxidation-reduction reaction with a positive electrode material and a negative electrode material, and accordingly excellent in resistance to an oxidation-reduction reaction. Note that apexes of diffraction peaks in the X-ray diffraction pattern may vary within the above-described ranges of the diffraction angle 2θ in accordance with a composition of the solid electrolyte according to the present invention.

The solid electrolyte according to the present invention is a solid electrolyte containing x atomic % of lithium, y atomic % of phosphorus, z atomic % of sulfur, and w atomic % of oxygen, the x, the y, the z, and the w satisfying the above-described expressions (1)-(5).

The solid electrolyte according to the present invention is composed of constituents including lithium, phosphorus, sulfur, and oxygen, and its major constituent is a thermodynamically-metastable phase made of these constituents. Furthermore, the solid electrolyte according to the present invention contains merely a small amount of thermodynamically-stable phases (crystalline compounds) such as a sulfide, an oxide and a sulfate, the amount being too small to being detected by some of the X-ray diffraction methods using an X-ray diffraction apparatus commercially available at present.

In the present invention, the above-described x, y, z, and w satisfy the above-described expressions (1)-(5), so that it is possible to obtain a solid electrolyte having high ion conductivity and excellent resistance to an oxidation-reduction reaction.

The solid electrolyte according to the present invention has an oxygen content of at least 1 atomic % and at most 10 atomic %. This is because, if the solid electrolyte according to the present invention has an oxygen content of less than 1 atomic %, resistance to an oxidation-reduction reaction cannot be obtained, and if it has an oxygen content exceeding 10 atomic %, a thermodynamically-metastable structure becomes unstable, which may result in decomposition of the solid electrolyte according to the present invention and precipitation of a crystalline compound having low ion conductivity, and hence high ion conductivity cannot be obtained.

Ion conductivity of the solid electrolyte according to the present invention at 25° C. is preferably at least $1 \times 10^{-3}$ S/cm. Furthermore, when there is considered a case where the solid electrolyte according to the present invention is used for a lithium secondary battery, an ion conducting through the solid electrolyte according to the present invention is preferably a lithium ion.

As such, when the solid electrolyte according to the present invention has high ion conductivity of at least $1 \times 10^{-3}$ S/cm, a lithium ion can easily move between a positive electrode and a negative electrode in a lithium secondary battery composed by sandwiching the solid electrolyte according to the present invention between the positive electrode and the negative electrode. Accordingly, an energy output of the lithium secondary battery tends to increase.

Furthermore, the solid electrolyte according to the present invention preferably has activation energy of not larger than 35 kJ/mol.

If the solid electrolyte according to the present invention has low activation energy of not larger than 35 kJ/mol, ion conductivity of the solid electrolyte according to the present invention tends to further increase.

The above-described solid electrolyte according to the present invention can be produced, for example, as follows.

Initially, a film-like solid electrolyte precursor containing x atomic % of lithium, y atomic % of phosphorus, z atomic % of sulfur, and w atomic % of oxygen is formed on a base material by a vapor deposition method, the x, the y, the z, and the w satisfying the above-described expressions (1)-(5) (a first step).

At this time, for the vapor deposition method, it is possible to use, for example, a vacuum evaporation method, an ion plating method, a sputtering method, or a laser abrasion method, or the like. For atmospheric gas used in forming the solid electrolyte precursor, it is possible to suitably use an inert gas such as helium, neon, or argon. Furthermore, the atmosphere used in forming the solid electrolyte precursor on the base material preferably has a pressure of at least $10^{-3}$ Pa and at most $10^{-1}$ Pa.

For a starting raw material, it is possible to use a sulfide such as $Li_2S$ or $P_2S_5$, and an oxide such as $Li_2O$, $P_2O_5$, or $Li_3PO_4$. At this time, a composition of the starting raw material is prepared such that the solid electrolyte precursor to be formed on the base material is composed to contain x atomic % of lithium, y atomic % of phosphorus, z atomic % of sulfur, and w atomic % of oxygen, the x, the y, the z, and the w satisfying the above-described expressions (1)-(5). As to the oxygen contained in the solid electrolyte according to the present invention, the oxygen content may be adjusted by mixing oxygen into the atmospheric gas used in forming the solid electrolyte precursor.

Next, the solid electrolyte precursor is heated to form the same into a solid electrolyte, the solid electrolyte being such that apexes of X-ray diffraction peaks in an X-ray diffraction pattern obtained by an X-ray diffraction method using a Kα-ray of Cu exist at diffraction angles 2θ of 16.7°±0.25°, 20.4°±0.25°, 23.8°±0.25°, 25.9°±0.25°, 29.4°±0.25°, 30.4°±0.25°, 31.7°±0.25°, 33.5°±0.25°, 41.5°±0.25°, 43.7°±0.25°, and 51.2°±0.25°, respectively, in the X-ray diffraction pattern, and that a half-width of each of the diffraction peaks is not larger than 0.5° (a second step).

At this time, the solid electrolyte precursor can be heated when and/or after the solid electrolyte precursor is formed.

From a viewpoint of allowing the solid electrolyte according to the present invention to be a thermodynamically-metastable phase excellent in ion conductivity and resistance to an oxidation-reduction reaction, the solid electrolyte precursor is preferably heated to a temperature higher than 200° C. and lower than a glass transition temperature of the solid electrolyte precursor. If the solid electrolyte precursor is heated to a temperature of not lower than the glass transition temperature of the solid electrolyte precursor, a thermodynamically-stable crystalline compound (crystalline compound) is formed in the solid electrolyte according to the present invention, resulting in a mixture of a crystalline compound made of lithium, phosphorus and sulfur, and a crystalline compound made of lithium, phosphorus and oxygen. If such a mixture is formed, a crystalline compound that does not contain oxygen is precipitated on a part of the resultant solid electrolyte, which makes it impossible to obtain high ion conductivity and excellent resistance to an oxidation-reduction reaction.

When there is considered a fact that the solid electrolyte according to the present invention usually has a glass transition temperature of not lower than 250° C. and not higher than 300° C., the solid electrolyte precursor is preferably heated to not lower than 200° C. and not higher than 250° C., and more preferably not lower than 220° C. and not higher than 230° C., from a viewpoint of allowing the solid electrolyte according to the present invention to be a thermodynamically-metastable phase excellent in ion conductivity and resistance to an oxidation-reduction reaction.

Time required for heating the above-described solid electrolyte precursor is not particularly limited, and may be set to, for example, at least 1 second and at most 10 seconds.

If the solid electrolyte precursor is heated after it is formed, an inert gas such as helium, neon, or argon may be used suitably for atmospheric gas used in heating the same.

The solid electrolyte according to the present invention is excellent in resistance to an oxidation-reduction reaction, so that it is less likely to decompose and degrade owing to an oxidation-reduction reaction with a positive electrode material and a negative electrode material, and has high ion conductivity. When the solid electrolyte according to the present invention is used for a lithium secondary battery, a lithium-containing metal can be used for a negative electrode material, which makes it possible to obtain a lithium secondary battery having high energy density and capable of suppressing performance deterioration even if it is repeatedly charged and discharged.

Furthermore, the solid electrolyte according to the present invention is nonflammable, so that it is possible to obtain a lithium secondary battery having a high level of safety.

Such a solid electrolyte according to the present invention can be produced by a method of producing a solid electrolyte according to the present invention.

EXAMPLE

Under the following procedure, a solid electrolyte containing lithium, phosphorus, sulfur, and oxygen was formed on a base material by a laser abrasion method.

Initially, there was prepared a silica glass substrate having a square surface with a side of 25 mm, and a thickness of 1 mm. The silica glass substrate was fixed to a base material support in a laser abrasion film forming apparatus.

A starting raw material was fabricated by mixing 1.1 g of lithium sulfide ($Li_2S$) powder and 2.4 g of phosphorus sulfide ($P_2S_5$) powder in a glove box filled with argon gas having a dew point of −80° C., and pouring the mixed powders into a mold for pressure molding to obtain a pellet having a diameter of 20 mm.

The starting raw material was removed from the glove box while prevented from being exposed to air, and fixed at a target holder in the laser abrasion film forming apparatus.

Next, a pressure in the laser abrasion film forming apparatus was adjusted to $1 \times 10^{-2}$ Pa, and a film-like solid electrolyte precursor was formed on the silica glass substrate by a laser abrasion method.

At that time, for atmospheric gas used in forming the solid electrolyte precursor, a mixed gas made by adding oxygen gas to argon gas (volume of argon gas: volume of oxygen gas=95:5) was used. A thickness of the solid electrolyte precursor formed on the base material was measured with a stylus profilometer to be 0.5 μm. A composition of the solid electrolyte precursor formed on the base material was analyzed with the use of an X-ray Photoelectron Spectroscopy (XPS) analyzer (ESCA5400MC from ULVAC-PHI INC.) to find that 31 atomic % of lithium, 15 atomic % of phosphorus, 45 atomic % of sulfur, and 9 atomic % of oxygen were contained therein.

Subsequently, the solid electrolyte precursor formed on the base material was heated in an argon gas atmosphere having a dew point of −90° C., at 225° C. for 2 seconds, to fabricate a solid electrolyte. A glass transition temperature of the solid electrolyte precursor was approximately 250° C.

Next, the heated solid electrolyte was cooled, and a comb-like gold electrode was formed on a surface of the cooled solid electrolyte. As to the solid electrolyte having the comb-like gold electrode formed thereon, ion conductivity of the solid electrolyte was measured by a complex impedance method. At that time, ion conductivity was measured at each of the temperatures ranging from a room temperature (25° C.) to approximately 200° C., in an argon gas atmosphere having a dew point of −90° C.

Figure 3:
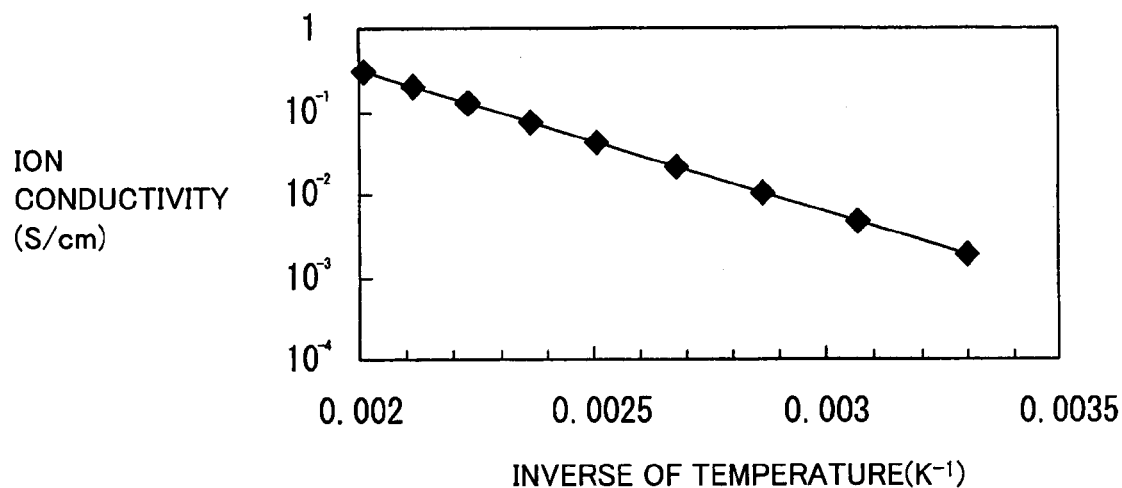
FIG. 3 is an Arrhenius plot of an example of a solid electrolyte according to the present invention.

FIG. 3 shows an Arrhenius plot obtained by the above-described measurement of ion conductivity. In FIG. 3, an axis of ordinates represents ion conductivity (S/cm), while an axis of abscissas represents an inverse of temperature ($K^{-1}$) at the above-described measurement of ion conductivity.

Activation energy in the solid electrolyte obtained in the present example was determined from a slope of the Arrhenius plot to be 32 kJ/mol. Ion conductivity of the solid electrolyte obtained in the present example, at a room temperature (25° C.), was $1.5 \times 10^{-3}$ S/cm.

Figure 4:
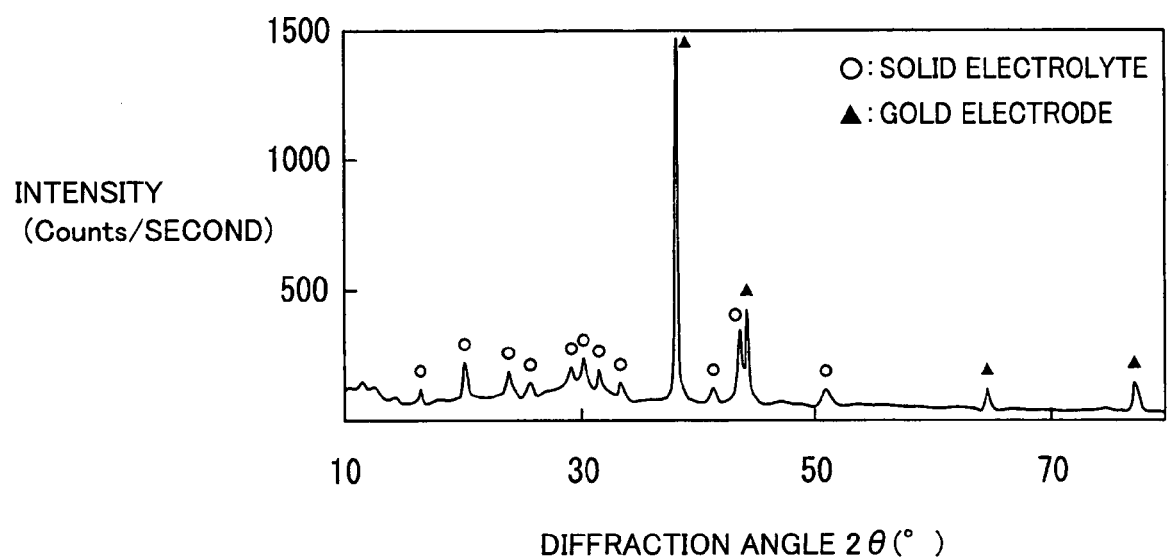
FIG. 4 shows an X-ray diffraction pattern of the example of the solid electrolyte according to the present invention, which pattern is obtained by an X-ray diffraction method using a Kα-ray of Cu.

After the above-described measurement of ion conductivity, an X-ray diffraction pattern of the solid electrolyte obtained in the present example was measured by an X-ray diffraction method using a Kα-ray of Cu as an X-ray, in an argon gas atmosphere having a dew point of −90° C. The results are shown in FIG. 4. In the X-ray diffraction pattern shown in FIG. 4, X-ray diffraction peaks of the solid electrolyte obtained in the present example are shown by white circles, while X-ray diffraction peaks of the gold electrode are shown by black triangles. In FIG. 4, an axis of ordinates represents intensity of the X-ray diffraction peaks (Counts/second), while an axis of abscissas represents a diffraction angle 2θ.

As shown in FIG. 4, apexes of the X-ray diffraction peaks in the X-ray diffraction pattern of the solid electrolyte obtained in the present example, which patterns were obtained by the X-ray diffraction method using the Kα-ray of Cu, exist at diffraction angles 2θ=16.7°±0.25°, 20.4°±0.25°, 23.8°±0.25°, 25.9°±0.25°, 29.4°±0.25°, 30.4°±0.25°, 31.7°±0.25°, 33.5°±0.25°, 41.5°±0.25°, 43.7°±0.25°, and 51.2°±0.25°, respectively, in the X-ray diffraction pattern, and a half-width of each of the X-ray diffraction peaks is not larger than 0.5°.

The solid electrolyte containing lithium, phosphorus, sulfur, and oxygen, and having such an X-ray diffraction pattern as shown in FIG. 4 is not known at the present time, and it was revealed that the solid electrolyte obtained in the present example is a totally new, thermodynamically-metastable phase.

Furthermore, it was confirmed that the solid electrolyte obtained in the present example has activation energy of 32 kJ/mol, and hence is chemically stable and excellent in resistance to an oxidation-reduction reaction.

Moreover, it was confirmed that the solid electrolyte obtained in the present example has ion conductivity of $1.5 \times 10^{-3}$ S/cm at a room temperature (25° C.), and hence has high ion conductivity comparable to that of an organic electrolytic solution used for a lithium secondary battery.

COMPARATIVE EXAMPLE

A solid electrolyte in a comparative example was fabricated in a manner similar to that of the example, except that a solid electrolyte precursor formed by a laser abrasion method on a silica glass substrate was not heated.

As in the example, a comb-like gold electrode was formed on a surface of the solid electrolyte in the comparative example to measure ion conductivity. The result was that the solid electrolyte in the comparative example had ion conductivity of $7 \times 10^{-4}$ S/cm at a room temperature (25° C.), so that it was confirmed that ion conductivity of the comparative example is significantly lowered when compared with that of the solid electrolyte in the example.

Figure 5:
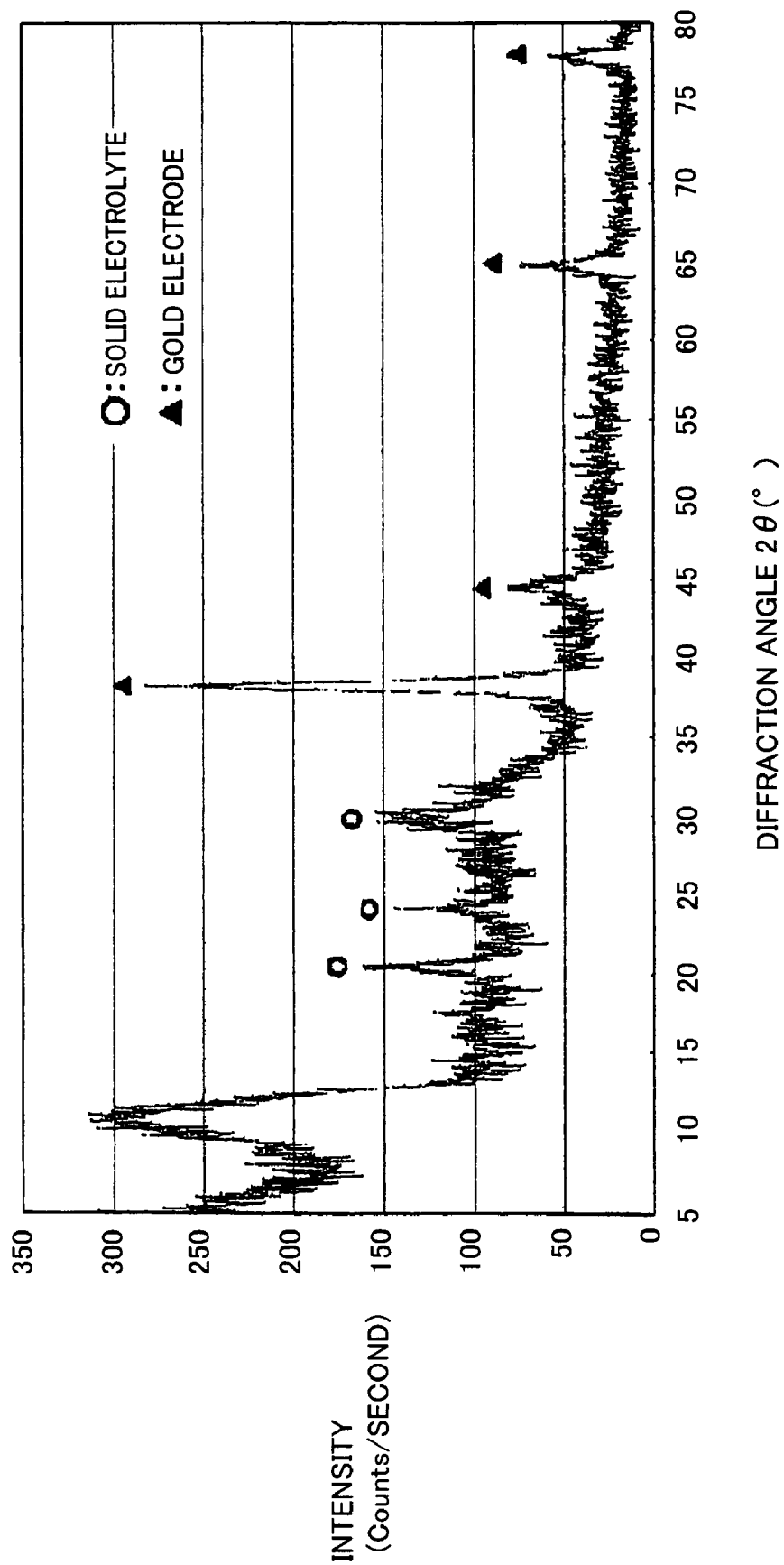
FIG. 5 shows an X-ray diffraction pattern of a solid electrolyte of a comparative example, which pattern is obtained by the X-ray diffraction method using the Kα-ray of Cu.

After the above-described measurement of ion conductivity, an X-ray diffraction pattern of the solid electrolyte obtained in the comparative example was measured by an X-ray diffraction method using a Kα-ray of Cu as an X-ray, in an argon gas atmosphere having a dew point of −90° C. The results are shown in FIG. 5. In the X-ray diffraction pattern shown in FIG. 5, X-ray diffraction peaks of the solid electrolyte obtained in the comparative example are shown by white circles, while X-ray diffraction peaks of the gold electrode are shown by black triangles. In FIG. 5, an axis of ordinates represents intensity of the X-ray diffraction peaks (Counts/second), while an axis of abscissas represents a diffraction angle 2θ.

As shown in FIG. 5, it was confirmed that some of half-widths of the X-ray diffraction peaks of the solid electrolyte in the comparative example exceed 0.5°.

As described above, when the solid electrolyte according to the present invention is used for a lithium secondary battery, it is possible to suppress decomposition and degradation of the solid electrolyte due to an oxidation-reduction reaction between the solid electrolyte and a positive electrode material and/or a negative electrode material.

Accordingly, in a lithium secondary battery using the solid electrolyte according to the present invention, even if a lithium-containing metal or the like is used for a negative electrode material of the lithium secondary battery to improve its energy density, a reduction reaction at an interface between the solid electrolyte according to the present invention and the negative electrode is suppressed, which lowers the probability of dendrite growth of the lithium-containing metal at a surface of the negative electrode. Accordingly, the lithium secondary battery using the solid electrolyte according to the present invention has a low risk of explosion due to a short circuit between the positive electrode and the negative electrode caused by the lithium-containing metal grown in a dendrite form.

Furthermore, the solid electrolyte according to the present invention is excellent in resistance to an oxidation-reduction reaction, and hence it is less likely to degrade even in a reflow process performed in mounting the lithium secondary battery on a printed circuit board.

The solid electrolyte according to the present invention has such characteristics as high ion conductivity, low oxidation-reduction reactivity with a positive electrode material and a negative electrode material, and hence it can suitably be used for coin-type (button-type), stacked-type, and coil-type lithium secondary batteries.

The method of producing the solid electrolyte according to the present invention can suitably be used for producing the solid electrolyte according to the present invention, which solid electrolyte has high ion conductivity and low oxidation-reduction reactivity with a positive electrode material and a negative electrode material.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolyte containing x atomic % of lithium, y atomic % of phosphorus, z atomic % of sulfur, and w atomic % of oxygen, wherein
said x, said y, said z, and said w satisfy the following expressions (1)-(5):

$$20 \leq x \leq 45 \quad (1)$$

$$10 \leq y \leq 20 \quad (2)$$

$$35 \leq z \leq 60 \quad (3)$$

$$1 \leq w \leq 10 \quad (4)$$

$$x+y+z+w=100 \quad (5), \text{ and}$$

apexes of X-ray diffraction peaks in an X-ray diffraction pattern obtained by an X-ray diffraction method using a Kα-ray of Cu exist at diffraction angles 2θ of 16.7°±0.25°, 20.4°±0.25°, 23.8°±0.25°, 25.9°±0.25°, 29.4°±0.25°, 30.4°±0.25°, 31.7°±0.25°, 33.5°±0.25°, 41.5°±0.25°, 43.7°±0.25°, and 51.2°±0.25°, respectively, in said X-ray diffraction pattern, and a half-width of each of said X-ray diffraction peaks is not larger than 0.5°.

2. The solid electrolyte according to claim 1, wherein ion conductivity at 25° C. is at least $1 \times 10^{-3}$ S/cm.

3. The solid electrolyte according to claim 1, wherein activation energy is not larger than 35 kJ/mol.

4. A method of producing a solid electrolyte, comprising:
a first step of forming, on a base material, a solid electrolyte precursor containing x atomic % of lithium, y atomic % of phosphorus, z atomic % of sulfur, and w atomic % of oxygen by a vapor deposition method, said x, said y, said z, and said w satisfying the following expressions (1)-(5):

$$20 \leq x \leq 45 \quad (1)$$

$$10 \leq y \leq 20 \quad (2)$$

$$35 \leq z \leq 60 \quad (3)$$

$$1 \leq w \leq 10 \quad (4)$$

$$x+y+z+w=100 \quad (5); \text{ and}$$

a second step of forming said solid electrolyte precursor into the solid electrolyte by heating said solid electrolyte precursor, the solid electrolyte being such that apexes of X-ray diffraction peaks in an X-ray diffraction pattern obtained by an X-ray diffraction method using a Kα-ray of Cu exist at diffraction angles 2θ of 16.7°±0.25°, 20.4°±0.25°, 23.8°±0.25°, 25.9°±0.25°, 29.4°±0.25°, 30.4°±0.25°, 31.7°±0.25°, 33.5°±0.25°, 41.5°±0.25°, 43.7°±0.25°, and 51.2°±0.25°, respectively, in said X-ray diffraction pattern, and that a half-width of each of said X-ray diffraction peaks is not larger than 0.5°.

5. The method of producing the solid electrolyte according to claim 4, wherein said second step is a step of heating said solid electrolyte precursor to a temperature higher than 200° C. and lower than a glass transition temperature of said solid electrolyte precursor, when and/or after said solid electrolyte precursor is formed.

6. The method of producing the solid electrolyte according to claim 5, wherein said solid electrolyte precursor is heated to a temperature higher than 200° C. and not higher than 250° C.

* * * * *